United States Patent

Kostenbauer et al.

[15] 3,705,398

[45] Dec. 5, 1972

[54] DIGITAL FORMAT CONVERTER

[72] Inventors: Ronald F. Kostenbauer; James P. Welch, both of Glendora, Calif.

[73] Assignee: Odetics, Inc., Anaheim, Calif.

[22] Filed: Aug. 11, 1970

[21] Appl. No.: 62,954

[52] U.S. Cl. ..............340/347 DD, 325/38 A, 178/68
[51] Int. Cl. ..............................................H03k 13/24
[58] Field of Search..340/347 DD; 325/38 A; 178/68

[56] References Cited

UNITED STATES PATENTS

| | | | |
|---|---|---|---|
| 3,452,348 | 6/1969 | Vallee | 340/347 DD |
| 3,135,947 | 6/1964 | Grondin et al. | 340/347 DD |
| 3,349,328 | 10/1967 | Hunkins et al. | 340/347 DD |
| 3,448,445 | 6/1969 | Vallee | 340/347 DD |

*Primary Examiner*—Maynard R. Wilbur
*Assistant Examiner*—Joseph M. Thesz, Jr.
*Attorney*—Hinderstein & Silber

[57] ABSTRACT

Apparatus for converting serial digital data which is phase encoded in accordance with any bi-phase or double density format to its NRZ format equivalent accompanied by a coherent clock signal. The input data and a train of clock pulses are applied to a data synchronizer which generates a first pulse for each leading and trailing edge transition of the input data in synchronism with the clock pulses. A ring counter driven by the clock pulses generates a series of second pulses in accordance with a predetermined time sequence, the first pulses being applied to the ring counter to restart the time sequence, whereby the output of the ring counter is indicative of the absence of a transition of the input data for a predetermined time period. The first and second pulses are applied to a flip-flop which changes state upon the occurrence of a first or a second pulse, the output of the flip-flop comprising a coherent clock signal. The first and second pulses and the clock signal are applied to logic circuitry which generates the NRZ format equivalent of the input data for all bi-phase and double density formats.

31 Claims, 5 Drawing Figures

INVENTORS
RONALD F. KOSTENBAUER
JAMES P. WELCH
BY
Hinderstein & Silber
ATTORNEYS INVENTORS
RONALD F. KOSTENBAUER
JAMES P. WELCH
BY Hinderstein & Silber
ATTORNEYS INVENTORS
RONALD F. KOSTENBAUER
JAMES P. WELCH
BY
Hinderstein & Silber
ATTORNEYS INVENTORS
RONALD F. KOSTENBAUER
JAMES P. WELCH
BY Hinderstein & Sibler
ATTORNEYS

DIGITAL FORMAT CONVERTER

BACKGROUND OF THE INVENTION

1. Field of the Invention

The present invention relates to a digital format converter and, more particularly, to apparatus for converting serial digital data which is phase encoded in accordance with any self-clocking bi-phase or double density format to its NRZ format equivalent accompanied by a coherent clock signal.

2. Description of the Prior Art

Conventional data handling systems usually require input digital data to be phase encoded in accordance with the standard non-return-to-zero (NRZ) format. In the NRZ format, a "0" is represented by an output signal at a first voltage level and a "1" is represented by an output signal at a second, higher voltage level. Since several bit cells may occur without a transition of the data from one voltage level to the other, NRZ encoded data is usually accompanied by a coherent clock signal which defines the boundaries of the bit cells.

When transmitting serial digital data over a data communication network, it is desirable to encode such data in accordance with a self-clocking format so that a separate clock signal need not be transmitted. Elimination of the separate clock signal eliminates the necessity for an additional communications channel.

Several self-clocking codes are presently in existence and are widely used. Such self-clocking codes may be divided into bi-phase codes where there is at least one phase change of the data signal during each bit cell and double density codes where there is at least one phase change of the data signal for every two bit cells. One example of a bi-phase code is the split-phase mark code where a "0" is represented by a single phase change during each bit cell and a "1" is represented by two phase changes during each bit cell. A second example of a bi-phase code is the split-phase space code, which is the reciprocal of the split-phase mark code, where a "1" is represented by a single phase change during each bit cell and a "0" is represented by two phase changes during each bit cell. A third example of a bi-phase code is the split-phase level code where a "1" is represented by a transition from a higher voltage level to a lower voltage level at the center of a bit cell and a "0" is represented by a transition from the lower voltage level to the higher voltage level at the center of a bit cell.

An example of a double density code is where a "0" is represented by a transition, either from a high voltage level to a low voltage level or visa versa, at the end of a bit cell and a "1" may or may not be indicated by a transition at the middle of a bit cell. In other words, if a "1" follows a "0", so that there was a transition at the end of the preceding bit cell, there will neither be a transition at the middle or the end of the bit cell where the "1" occurred. On the other hand, where a "1" follows a "1", so that there was not a transition at the end of the preceding bit cell, there will be a transition at the middle of the bit cell where the "1" occurred.

Where digital data which is phase encoded in accordance with a bi-phase or double density format is transmitted over a communications channel to eliminate the necessity for transmitting a clock signal, it becomes necessary, at the receiving location, to convert the data to its NRZ format equivalent for application to a shift register or other data handling system. It is also necessary to generate a coherent clock signal to define the boundaries of the bit cells.

Several systems have been developed for converting self-clocking digital input data to its NRZ format equivalent, but all of such systems suffer from at least one of several problems. In the first instance, essentially all systems are designed to convert from one self-clocking code format to an NRZ encoded format and there is no general purpose converter which can accept serial digital data which is phase encoded in accordance with any bi-phase and/or double density format and convert such data to its NRZ format equivalent accompanied by a coherent clock signal. In addition, even where a system is capable of converting from a single self-clocking code to an NRZ code, substantial problems usually exist. Most prevalent, is the fact that such systems are only capable of operating at a single data rate and the entire system must be modified when the data rate changes. By way of example, one prior art system, as described in an article entitled "Leach Claiming Data Packing Improvements of at Least 18:1" by Charles D. LaFond, appearing by the May 29, 1967 issue of *Technology Week*, requires the input data, phase encoded in accordance with a split-phase mark format, to be applied to a one-bit delay network. The output of the delay network and the undelayed input data are compared by a decoder which performs an "exclusive OR" function, the output of the decoder being the restored NRZ data. The system also requires filters for squaring the delayed and undelayed signals into fast rise-time square waves. Therefore, since the correct operation of the system requires an accurate one-bit delay, when the data rate changes, it is necessary to change the delay network. In addition, since the filters used in such systems are bit rate sensitive, they must also be changed when the data rate changes. Furthermore, since the comparision of the delayed and undelayed signals in the decoder usually generates very narrow pulses or "slivers" at the boundaries between adjacent bit cells, it is necessary to employ additional filters to eliminate such slivers. Since these filters are also bit rate sensitive, they must be changed when the data rate changes. Also, since these systems operate on the principle of an accurate delay of the input signal, such systems do not have the ability of tracking instantaneous changes in the data rate.

Another problem encountered with available conversion systems in the generation of a clock signal synchronized with the NRZ output data. The most prevalent method for deriving such a clock signal uses a phase-locked oscillator circuit including a voltage controlled oscillator, the output of which is compared in a phase comparator with the leading and trailing edges of the input data. The output of the phase comparator is filtered to provide a d.c. signal which is applied to the voltage controlled oscillator to control its frequency. However, such phase-locked oscillator circuits are inherently incapable of tracking instantaneous data rate changes due to the delays introduced by the filter networks. In addition, such circuits operate poorly in the presence of noise in the data signal.

SUMMARY OF THE INVENTION

In accordance with the present invention there is provided apparatus for converting serial digital which is phase encoded in accordance with a self-clocking bi-phase or double density format to its NRZ format equivalent accompanied by a coherent clock signal which eliminates all of the problems inherent in prior art systems. In the first instance, the present system is capable of converting serial digital data which is phase encoded in any bi-phase or double density format to its NRZ format equivalent. Furthermore, the present system operates without any input as to what format the input data is in. In other words, the present system provides a plurality of NRZ encoded output signals, one for each possible bi-phase or double density input formats and it is only necessary to select the desired output signal based upon a knowledge of the format of the input data. Secondly, the present system is readily adaptable to changes in the data rate, only a single adjustment being required as the data rate changes. Furthermore, since this adjustment may be made externally of the system itself, there is no requirement to change circuit components when the data rate changes. By eliminating the use of delay networks and phase-locked oscillator circuits, the present system is capable of tracking instantaneous data rate changes of up to 27 percent in the case of a bi-phase input signal and up to approximately 12% for a double density input signal. Finally, the present system generates a coherent clock signal which is synchronized with the NRZ output signal, the clock signal having the same instantaneous phase as the data signal with no inherent delay.

Briefly, the present system utilizes a data synchronizer, responsive to the self-clocking digital data and a train of clock pulses for generating a first pulse for each leading and trailing edge transition of the input data in synchronism with the clock pulses. A ring counter driven by the clock pulses generates a series of second pulses in accordance with a predetermined time sequence, the first pulses being applied to the ring counter to restart the time sequence, whereby the output of the ring counter is indicative of the absence of a transition of the input data for a predetermined time period. The first and second pulses are applied to a flip-flop which changes state upon the occurrence of a first or a second pulse, the output of the flip-flop comprising a coherent clock signal. The first and second pulses and the clock signal are applied to logic circuitry which generates the NRZ format equivalent of the input data for all bi-phase and double density formats.

It is therefore an object of the present invention to provide a digital format converter for converting from self-clocking codes to NRZ code.

It is a further object of the present invention to provide apparatus for converting serial digital data which is phase encoded in accordance with any self-clocking, bi-phase or double density format to its NRZ format equivalent.

It is a still further object of the present invention to provide apparatus for converting self-clocking digital input data to its NRZ format equivalent and a coherent clock signal.

It is another object of the present invention to provide a digital format converter which is readily adaptable to changes in the input data rate.

It is still another object of the present invention to provide a digital format converter which is insensitive to minor instantaneous data rate changes.

Another object of the present invention is the provision of a digital format converter which completely eliminates the necessity for delay networks and filter circuits and their attendant problems.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
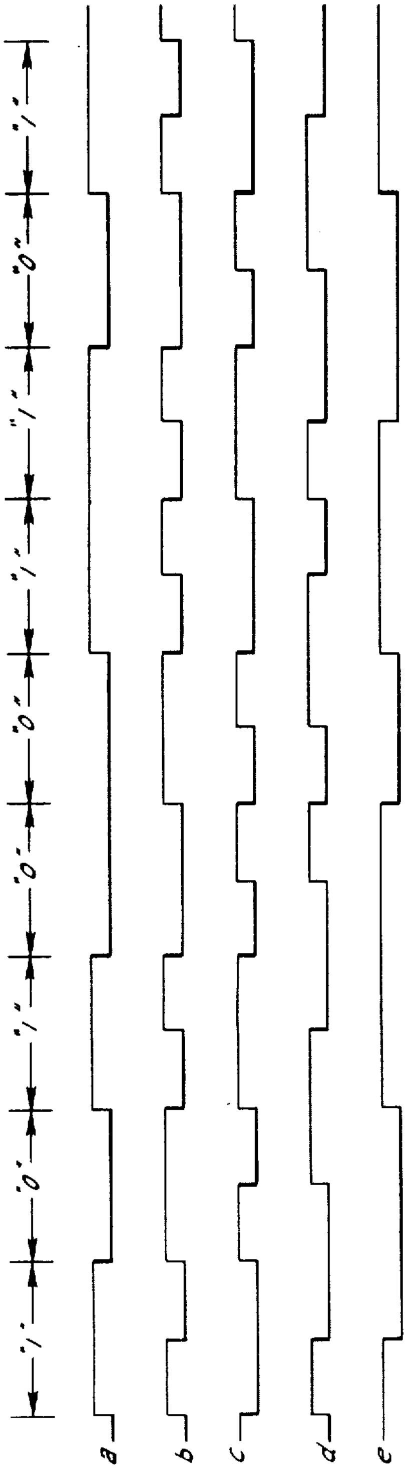
FIG. 1 is a series of waveforms useful in explaining the operation of the present invention.

Referring now to the drawings and, more particularly, to FIG. 1 thereof, the present digital format converter accepts as an input signal, serial digital data that has been phase encoded in any one of the standard bi-phase or double density formats and converts such data to its NRZ format equivalent accompanied by a coherent clock. FIG. 1 shows three possible bi-phase encoded formats and a double density encoded format as well as the NRZ format equivalent. More specifically, waveform *a* in FIG. 1 shows the standard NRZ format in which a "0" is represented by an output signal at a first voltage level and a "1" is represented by an output signal at a second, higher voltage level. Waveform *b* in FIG. 1 shows the bi-phase mark format equivalent of the NRZ data where a "0" is represented by a single phase change during each bit cell and a "1" is represented by two phase changes during each bit cell, one at the beginning of each bit cell and one in the middle of each bit cell. Waveform *c* in FIG. 1 shows the bi-phase space format equivalent of the NRZ data where a "1" is represented by a single phase change during each bit cell and a "0" is represented by two phase changes during each bit cell. It should be noted that the bi-phase space format is the exact reciprocal of the bi-phase mark format. Waveform *d* in FIG. 1 shows the bi-phase level format equivalent of the NRZ data where a "1" is represented by a transition from a higher voltage level to a lower voltage level at the center of a bit cell and a "0" is represented by a transition from the lower voltage level to the higher voltage level at the center of the bit cell. Finally, waveform *e* in FIG. 1 shows the double density format equivalent of the NRZ data where a "0" is represented by a transition, either from a high voltage level to a low voltage level, or visa versa, at the end of a bit cell and where a "1" may or may not be indicated by a transition at the middle of a bit cell. In other words, if a "1" follows a "0", as is the case in the second and third bit cells in waveform e in FIG. 1, there will neither be a transition at the middle or the end of the third bit cell, where the "1" occurs. On the other hand, where a "1" follows a "1", as is the case in the sixth and seventh bit cells in waveform e in FIG. 1, there will be a transition at the middle of the seventh bit cell, where the second "1" occurs. The obvious advantage of the double density phase encoded format is that the highest frequency is only half of the highest frequency of any of the bi-phase formats, thus the designation "double density."

Figure 2:
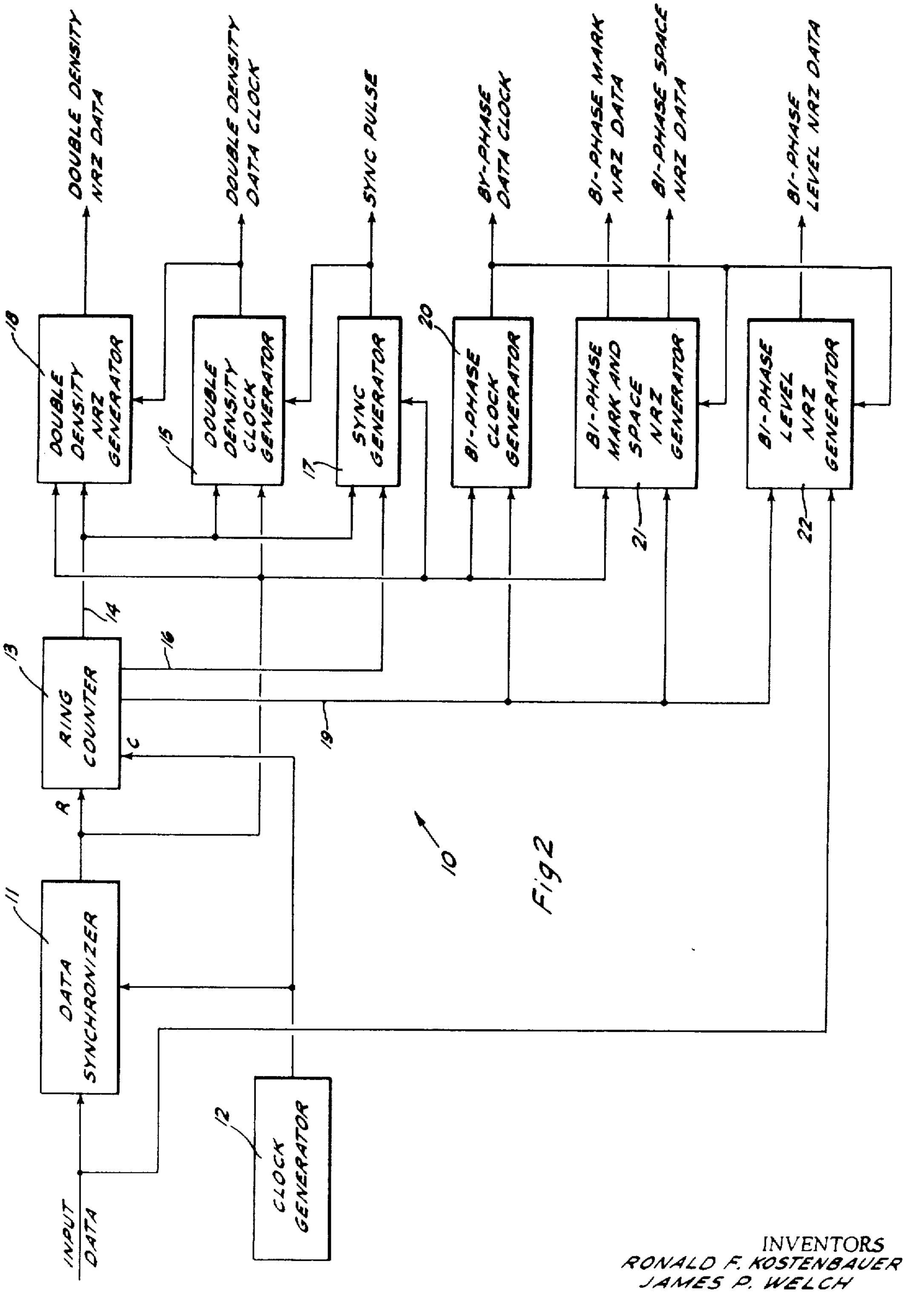
FIG. 2 is a block diagram of a data format converter constructed in accordance with the teachings of the present invention.

Referring now to FIG. 2, the present digital format converter, generally designated 10, includes a data synchronizer 11 which accepts the input serial digital data that has been phase encoded in any one of the standard bi-phase or double density formats. Data synchronizer 11 is operative to generate a pulse for each leading and trailing edge transition of the input data. Such leading and trailing edge pulses are generated in synchronism with clock pulses derived from a clock generator 12 which has a frequency substantially greater than the data transfer rate. For the purposes of the present disclosure, clock generator 12 will be described as generating clock pulses at sixteen times the normal data frequency. However, it will be apparent to those skilled in the art that such clock frequency is totally arbitrary and any suitable frequency may be utilized.

The output of data synchronizer 11, comprising a narrow pulse for every leading and trailing edge of the input data, is applied to the reset input terminal R of a ring counter 13. In the present example, ring counter 13 has six stages and is therefore capable of counting 12 pulses before recycling. The output of clock generator 12 is applied to the clock input terminal C of ring counter 13 which counts 12 clock pulses and then returns to zero. The leading and trailing edge pulses applied to ring counter 13 from data synchronizer 11 are used to reset ring counter 13 to zero.

Ring counter 13 has three outputs, a first one appearing on a line 14. Ring counter 13 provides a pulse on line 14 after eight clock pulses have been counted and a pulse after each additional twelve clock pulses have been counted. These pulses on line 14 are indicative of the absence of a transition of the input data for the time period represented by the spacing between such pulses. The output of ring counter 13 on line 14 is applied, together with the output of data synchronizer 11, to a double density clock generator 15 consisting of a logic element which changes state upon the occurrence of a pulse from ring counter 13 or data synchronizer 11. In this manner, the output of double density clock generator 15 comprises a coherent clock signal for the NRZ equivalent of a double density input.

The double density data clock from clock generator 15 is kept in the correct phase by a pulse derived from a second output of ring counter 13 appearing on a line 16. As will be explained more fully hereinafter, a pulse is generated on line 16 only after at least 24 pulses from clock generator 12 have been counted by ring counter 13 without a leading or trailing edge transition from data synchronizer 11. This will occur only when a data input word of 0-1-0 occurs, representing the lowest frequency component of the data, as can be seen from an inspection of waveform *e* in FIG. 1. This pulse on line 16 is applied together with the output on line 14 from ring counter 13 to a sync generator 17 which generates a sync pulse. Such sync pulse resets clock generator 15 to indicate that the data during the previous bit cell was a "0". This information is then used by clock generator 15, the output of which is applied to a double density NRZ generator 18. The leading and trailing edge pulses from data synchronizer 11 and the pulses on line 14 from ring counter 13 are also applied to generator 18 which generates the NRZ format equivalent for a double density data input.

Ring counter 13 provides a third output on a line 19 after 12 clock pulses have been counted by ring counter 13 after a leading or trailing edge pulse from data synchronizer 11. These pulses on line 19 are applied together with the leading and trailing edge pulses to a bi-phase clock generator 20 consisting of a logic element which changes state upon the occurrence of a pulse from ring counter 13 or data synchronizer 11. In this manner, the output of bi-phase clock generator 20 comprises a coherent clock signal for the NRZ equivalent of a bi-phase input. The pulses on line 19 are also applied to a bi-phase mark and space NRZ generator 21 and a bi-phase level NRZ generator 22, the former also receiving the leading and trailing edge pulses from data synchronizer 11 and the latter also receiving the input data. Generators 21 and 22 comprise logic elements which operate on these inputs to provide the NRZ format equivalent for a bi-phase data input.

Figure 3:
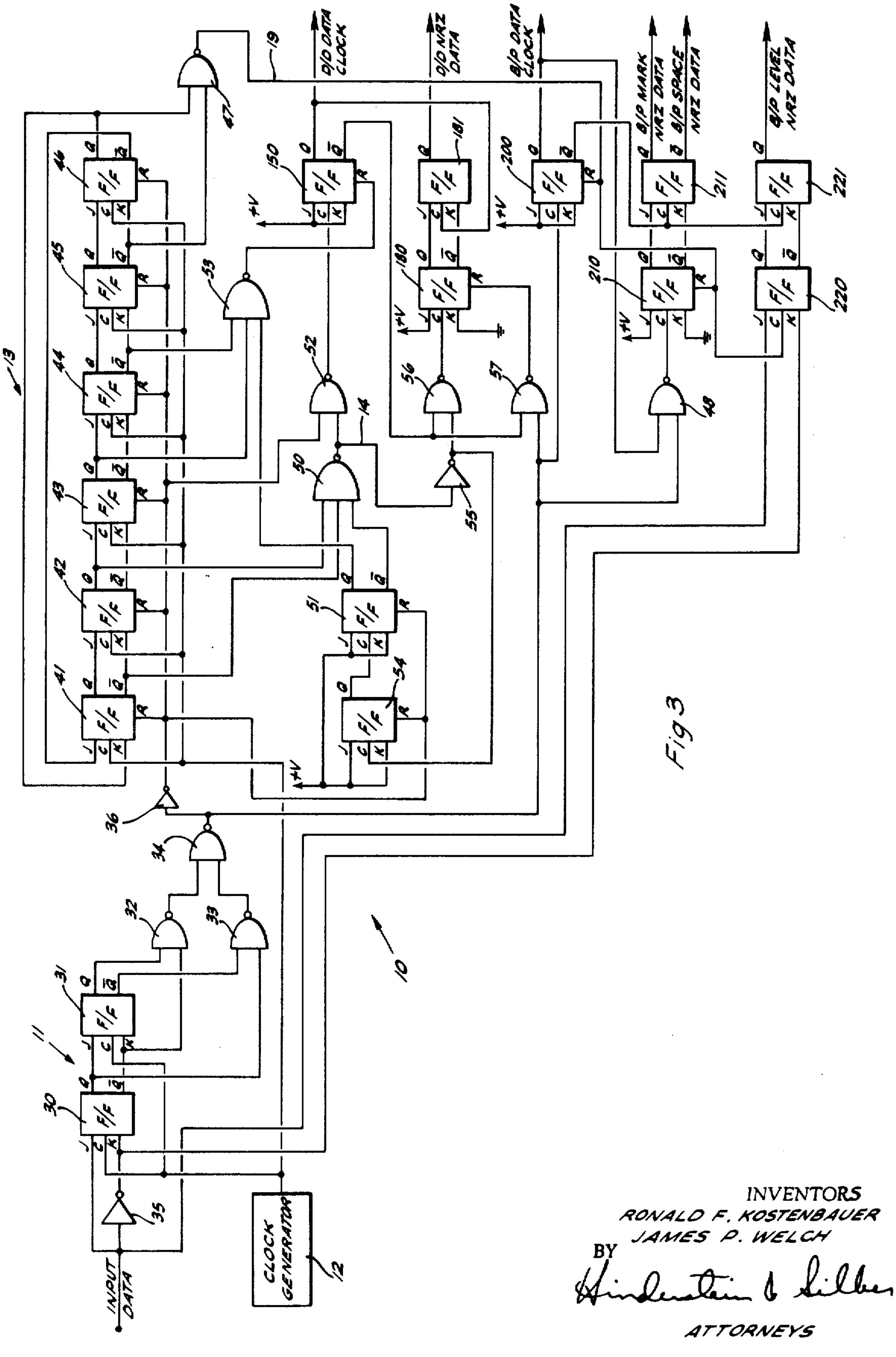
FIG. 3 is a detailed circuit diagram of a preferred embodiment of data format converter.

Referring now to FIG. 3, there is shown a preferred embodiment for data format converter 10. In the embodiment of FIG. 3, data format converter 10 is constructed from a plurality of J-K flip-flops, a plurality of inverters and a plurality of NAND gates of standard design (see Montgomery Phister, Jr., "Logical Design of Digital Computers", New York, John Wiley & Sons, Inc., 1959). Each of the J-K flip-flops has J and K input terminals, a clock input terminal C and a reset input terminal R. In addition, each of the J-K flip-flops has two complementary outputs indicated by Q and $\bar{Q}$. With a "1" at the J input terminal and a "0" at the K input terminal, a pulse at the C input terminal causes a "1" to appear at the Q output terminal and a "0" to appear at the $\bar{Q}$ output terminal. With the inputs reversed, and a "1" at the K input terminal and a "0" at the J input terminal, a pulse at the C input terminal causes a "1" to appear at the $\bar{Q}$ output terminal and a "0" to appear at the Q output terminal. If the inputs to the J and K terminals are the same (at a logical "1"), a pulse at the C input terminal causes the flip-flop to change state. Finally, a "0" at the R input terminal causes the flip-flop to generate a "0" at the Q output terminal and a "1" at the $\bar{Q}$ output terminal. The inverters simply invert the polarity of the input signal whereas the NAND gates are operative to generate a "0" at their output terminals only when all inputs are "1". For any other input condition, the output of the NAND gates are "1".

Data synchronizer 11 comprises first and second flip-flops 30 and 31, first, second and third 2-input NAND gates 32, 33 and 34 and an inverter 35. The input serial digital data is applied to the J input of flip-flop 30 and via inverter 35 to the K input of flip-flop 30. The Q and $\bar{Q}$ outputs of flip-flops 30 are applied to the J and K inputs, respectively, of flip-flop 31. The output of clock generator 12 is applied to the C inputs of flip-flops 30 and 31. The Q output of flip-flop 31 and the $\bar{Q}$ output of flip-flop 30 are applied to the inputs of NAND gate 32 whereas the Q output of flip-flop 30 and the $\bar{Q}$ output of flip-flop 31 are applied to the inputs of NAND gate 33. The outputs of gates 32 and 33 are applied to the inputs of NAND gate 34 which provides, at its output, the leading and trailing edge pulses.

Ring counter 13 comprises six flip-flops, 41 through 46, the Q output of each flip-flop, except flip-flop 46, being applied to the J input of the next flip-flop and the $\bar{Q}$ output of each flip-flop, except flip-flop 46, being applied to the K input of the next flip-flop. The Q and $\bar{Q}$ outputs of flip-flop 46 are applied to the K and J inputs, respectively, of flip-flop 41. The output of clock generator 12 is applied to the C inputs of flip-flops 41–46 whereas the leading and trailing edge pulses from gate 34 are applied to the R inputs of flip-flops 41-46 via an inverter 36. The Q output of flip-flop 42 and the $\bar{Q}$ output of flip-flop 41 are applied to the inputs of a 3-input NAND gate 50 which also receives a signal from the $\bar{Q}$ output of a flip-flop 51. The output of NAND gate 50 is applied to one input of a NAND gate 52 which also receives the output of gate 34 via inverter 36. The output of gate 52 is applied to the C input of a flip-flop 150 which functions as double density clock generator 15. A positive voltage is applied to the J and K inputs of flip-flop 150 so that it changes state upon every pulse from gate 52. Flop-flop 150 is reset by a pulse received from a 3-input NAND gate 53 which receives at its input terminals the $\bar{Q}$ output of flip-flop 44, the Q output of flip-flop 43 and the Q output of flip-flop 51. The Q output of flip-flop 150 provides the double density data clock.

Sync generator 17 consists of flip-flop 51, a flip-flop 54 and gate 53. Flip-flops 51 and 54 have positive voltages applied to their J and K input terminals so that they change state upon receiving a pulse at their C inputs. The output of gate 34 is applied to the R inputs of both flip-flops 51 and 54 via inverter 36. Flip-flop 54 receives a clocking signal from gate 50 via an inverter 55 whereas the Q output of flip-flop 54 is applied as a clocking input to flip-flop 51. The Q output of flip-flop 51 is applied to gate 53 which generates a sync pulse, as will be explained more fully hereinafter, whereas the $\bar{Q}$ output of flip-flop 51 is applied to gate 50 as a sync gate.

Double density NRZ generator 18 consists of a pair of flip-flops 180 and 181 and a pair of NAND gates 56 and 57. Both gates 56 and 57 receive at one input the $\bar{Q}$ output of flip-flop 150, gate 56 receiving at its other input the inverted output of gate 50 and gate 57 receiving at its other input the leading and trailing edge pulses from gate 34. The output of gate 56 is applied to the C input of flip-flop 180 whereas the output of gate 57 is applied to the R input of flip-flop 180. Flip-flop 180 receives a "1" at its J input terminal and a "0" at its K input terminal so that flip-flop 180 goes true for each clock input and goes false for each reset input. The Q and $\bar{Q}$ outputs of flip-flop 180 are applied to the J and K inputs respectively, of flip-flop 181, which receives the Q output of flip-flop 150 at its C input. The Q output of flip-flop 181 comprises the NRZ format equivalent of the double density input data.

Bi-phase clock generator 20 consists of a flip-flop 200. Flip-flop receives a "1" at each of its J and K inputs and the output of gate 34 at its C input. Flip-flop 200 also receives a pulse from a NAND gate 47 at its R input, gate 47 receiving the Q output of flip-flop 46 and the $\bar{Q}$ output of flip-flop 45. The Q output of flip-flop 200 provides the data clock when the input data is encoded in accordance with one of the bi-phase formats.

Bi-phase mark and space NRZ generator 21 comprises a pair of flip-flops 210 and 211 and a NAND GATE 48. NAND gate 48 receives, at its inputs, the output of gate 34 and the Q output of flip-flop 200, the output of gate 48 being applied to the C input of flip-flop 210. Flip-flop 210 receives a "1" and a "0" at its J and K inputs, respectively, and the output of gate 47 at its R input. The Q and $\bar{Q}$ outputs of flip-flop 210 are applied to the J and K inputs, respectively, of flip-flop 211, which also receives the $\bar{Q}$ output of flip-flop 200 at its C input. The Q output of flip-flop 211 provides the NRZ format equivalent where the input data is phase encoded in accordance with a bi-phase mark format whereas the $\bar{Q}$ output of flip-flop 211 provides the NRZ format equivalent where the input data is phase encoded in accordance with a bi-phase space format.

Bi-phase level NRZ generator 22 comprises a pair of flip-flops 220 and 221. Flip-flop 220 receives the input data and the inverted input data at its J and K inputs, respectively, and the output of gate 47 at its C input. The Q and $\bar{Q}$ outputs of flip-flop 220 are applied to the J and K inputs, respectively, of flip-flop 221 which receives the $\bar{Q}$ output of flip-flop 200 at its C input. The Q output of flip-flop 221 provides the NRZ format equivalent where the input data is phase encoded in accordance with a bi-phase level format.

The operation of data format converter 10 in the conversion of a data input signal that has been phase encoded in accordance with a double density format will now be described in connection with the waveforms of FIG. 4. A typical input signal, phase encoded in accordance with a double density format, is shown as waveform a in FIG. 4 with its NRZ significance indicated immediately thereabove. This data signal is fed to flip-flop 30 which changes state upon the occurrence of the first clock pulse from clock generator 12 after the input signal changes state. The output of flip-flop 30 is applied to the input of flip-flop 31 so that flip-flop 31 changes state upon the occurrence of the second clock pulse from generator 12 after the input data changes state. Except during this interval between the first and second clock pulses following a data transition, flip-flops 30 and 31 are in the same state and each of gates 32 and 33 receives a "0" and a "1" at its input terminals. Therefore, a "1" appears at the outputs of gates 32 and 33 and a "0" appears at the output of gate 34. On the other hand, during the time period between the first and second clock pulses following a data transition, flip-flops 30 and 31 are in opposite states and, depending upon the direction of the transition, one of gates 32 and 33 receives a "0" at both inputs whereas the other of gates 32 and 33 receives a "1" at both inputs. The output of the gate which receives a "0" at both inputs remains "1" but the output of the gate which receives a "1" at both inputs goes to "0". Since gate 34 now receives a "0" and a "1" at its inputs, it generates a "1" at its output. Upon the occurrence of the second clock pulse from generator 12 following a transition of the input data, flip-flop 31 assumes the same state as flip-flops 30 whereby each of gates 32 and 33 again generates a "1" and the output of gate 34 returns to "0". As a result, gate 34 generates, in synchronism with clock generator 12, a positive pulse upon the occurrence of every leading and trailing edge transition of the input data.

Figure 4:
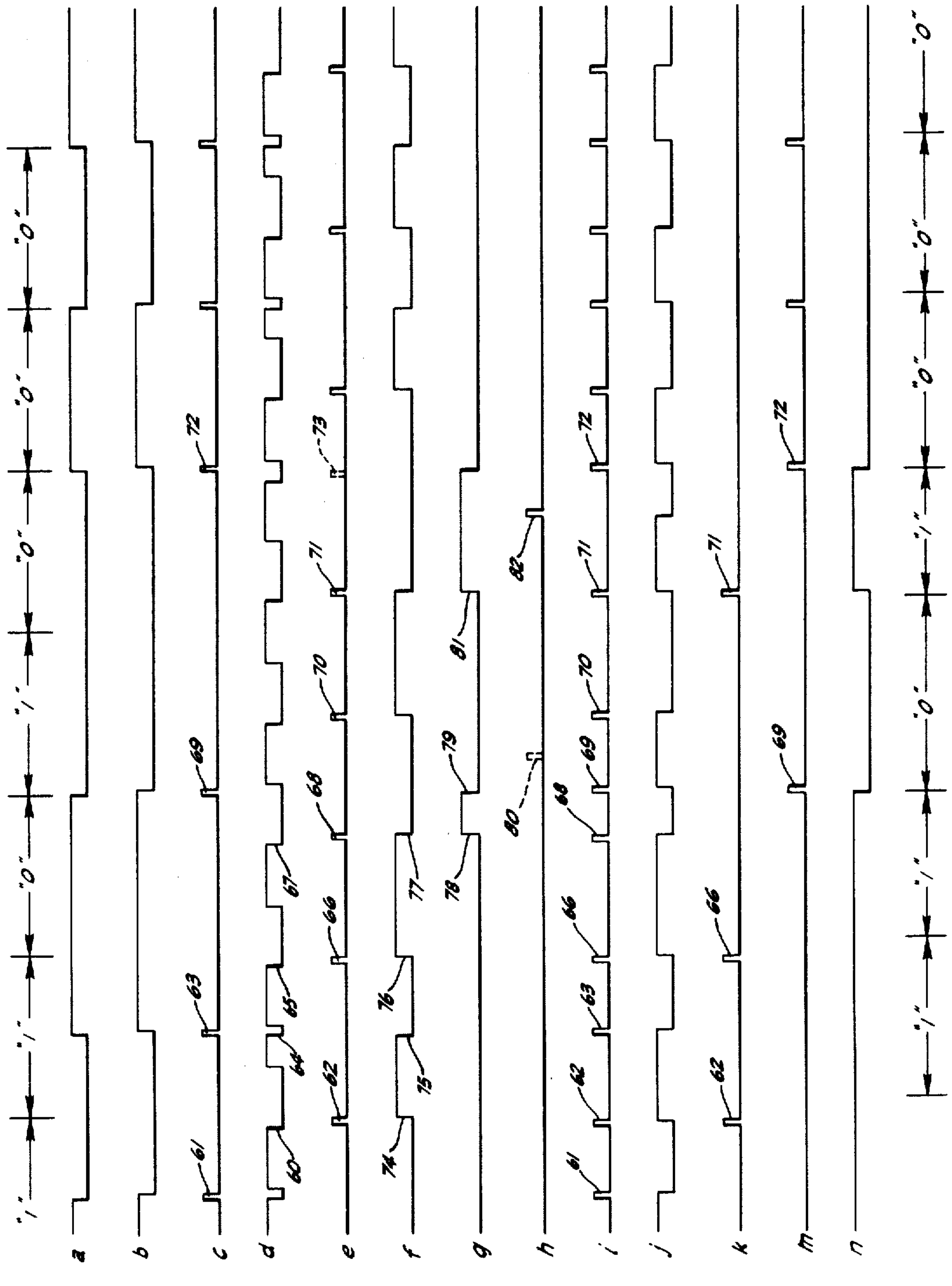

Waveform *b* in FIG. 4 shows the output of flip-flop 31, delayed relative to the input data, and waveform *c* in FIG. 4 shows the resulting pulses generated at each leading and trailing edge. The leading and trailing edge pulses are used to reset each of flip-flops 41-46 in ring counter 13. The next pulse from clock generator 12 causes flip-flop 41 to go true, the next succeeding clock pulse from generator 12 causing flip-flop 42 to go true, etc. When flip-flop 46 goes true, a "0" is applied to the J input of flip-flop 41 and a "1" is applied to the K input of flip-flop 41 so that the next clock pulse causes flip-flop 41 to go false, the next clock pulse from generator 12 causing flip-flop 42 to go false, etc. The next clock pulse after flip-flop 46 goes false causes flip-flop 41 to go true whereby the cycle repeats. Therefore, ring counter 13 counts twelve clock pulses after being reset by a leading or trailing edge pulse from gate 34.

The Q output of flip-flip 42 and the $\bar{Q}$ output of flip-flop 41 are applied to the inputs of gate 50. Accordingly, when flip-flop 41 is false and flip-flop 42 is true, a pulse appears at the output of gate 50. This pulse occurs after eight clock pulses have been counted by ring counter 13 after being reset by a leading or trailing edge pulse from gate 34 and for each twelve clock pulses thereafter. As will be explained more fully hereinafter, the inputs to gate 50 from flip-flops 41 and 42 are gated with the sync gate from flip-flop 51 to exclude from the output of gate 50 any pulses generated after the first two.

With reference now to FIG. 4, waveform *d* shows the Q output of flip-flop 41 and waveform *e* shows the pulses generated by gate 50. Accordingly, when flip-flop 41 goes false at 60, eight clock pulses after the leading and trailing edge pulse at 61, a pulse, hereinafter referred to as a double density (D/D) data pulse, is generated at 62. Since an additional leading and trailing edge pulse occurs at 63 before an additional 12 pulses from clock generator 12, flip-flop 41, as well as flip-flops 42-46, are reset to "0" at 64 and no additional D/D data pulse is generated 12 clock pulses after D/D data pulse 62. On the other hand, when flip-flop 41 goes false at 65, after leading edge pulse 63, gate 50 generates a D/D data pulse at 66. Twelve clock pulses later, when flip-flop 41 again goes false at 67, an additional D/D data pulse is generated at 68. The cycle then repeats when a trailing edge pulse 69 is generated causing the generation of D/D data pulses at 70 and 71. Since an additional 12 clock pulses occur before the next leading or trailing edge transition at 72, a D/D data pulse would be generated at 73 if not for the operation of the sync gate, as will be explained more fully hereinafter.

It can be seen from an inspection of waveforms *c* and *e* of FIG. 4, that a leading or trailing edge pulse is generated either at the middle of a bit cell or at the end of a bit cell, whenever a transition at that time occurs. When no transition occurs at the middle or the end of a bit cell, ring counter 13, in combination with gate 50, operate to generate a D/D data pulse either at or in the approximate vicinity of the end of a bit cell or at or in the approximate vicinity of the middle of a bit cell where no data transition occurs. Accordingly, by applying the double density data pulses from gate 50 and the leading and trailing edge pulses from gate 34, via an inverter 36, to the inputs of gate 52, the output of gate 52 comprises a series of pulses which indicate, either actually or approximately, the middle and end of each bit cell. These pulses at the output of gate 52, shown as waveform *i* in FIG. 4, are applied to the clock input terminal C of flip-flop 150 which changes state upon the occurrence of each pulse. The resulting output, shown as waveform *j* in FIG. 4, is a coherent clock signal which may be used in converting the double density input data to its NRZ format equivalent.

Flip-flop 150 is kept in the correct phase relative to the double density input data by noting the fact that a transition of the input data occurs only once in two bit cells only when a data input word of 0-1-0 occurs. This is shown in waveform *a* in FIG. 4 during the third, fourth and fifth bit cells. More specifically, each leading and trailing edge pulse from gate 34 resets flip-flops 51 and 54 in sync generator 17. With flip-flop 51 reset, a "0" is applied to one input of gate 53, thereby disabling gate 53, and a "1" is applied to one input of gate 50, thereby enabling gate 50. When a first D/D data pulse appears at the output of gate 50, eight clock pulses after a leading or trailing edge transition, such data pulse is applied via inverter 55 to the clock input of flip-flop 54. The Q output of flip-flop 54 is shown as waveform *f* in FIG. 4 whereas the Q output of flip-flop 51 is shown as waveform *g* in FIG. 4. Accordingly, when a D/D data pulse is generated at 62, flip-flop 54 goes true at 74. When a second D/D data pulse appears at the output of gate 50, this pulse is applied via inverter 55 to the C input of flip-flop 54 which again goes false. When flip-flop 54 goes false, a pulse is applied to the C input of flip-flop 51 which changes state, reversing the inputs to gates 50 and 53, disabling the former and enabling the latter. With reference to waveforms *f* and *q* in FIG. 4, before a second D/D data pulse can be generated by gate 50 after data pulse 62, leading edge pulse 63 resets flip-flop 54, at 75. The next D/D data pulse, at 66, sets flip-flop 54, at 76, whereas the next D/D data pulse, at 68, causes flip-flop 54 to go false, at 77. When flip-flop 54 goes false, at 77, flip-flop 51 goes true, at 78, disabling gate 50 and preventing any additional D/D data pulses from being generated. At the same time, flip-flop 51 enables gate 53.

Gate 53 receives additional inputs from the Q output of flip-flop 43 and the $\bar{Q}$ output of flip-flop 44. Accordingly, gate 53 generates a pulse, seven clock pulses after the second D/D data pulse from gate 50. It should be noted that the purpose of gate 53 is to generate a sync pulse anytime more than 1½ bit cells occur without a data transition, this situation only occurring when a data input word of 0-1-0 of double density occurs. Since the second D/D data pulse from gate 50 is generated after 20 clock pulses have been counted after a data transition, and since there are 16 clock pulses per bit cell, gate 53 may decode ring counter 13 anytime after an additional four clock pulses have been counted. In the present case, seven clock pulses have been arbitrarily selected to provide for instantaneous variations in the data rate.

Waveform *h* in FIG. 4 shows the output of gate 53. When flip-flop 51 goes true, at 78, gate 53 is enabled to generate a sync pulse after seven additional clock pulses. However, since a trailing edge transition occurs, at 69, four clock pulses later, flip-flop 51 is reset, at 79, and a sync pulse is not generated at 80. However, when flip-flop 51 goes true at 81, following D/D data pulses 70 and 71, no leading or trailing edge transition occurs for an additional 12 clock pulses. Accordingly, a sync pulse is generated by gate 53, at 82. It should also be noted that gate 50 is inhibited from generating a data pulse at 73 since, at this time, flip-flop 51 is true and gate 50 is inhibited.

The sync pulse from gate 53 is applied to the reset input terminal R of flip-flop 150 to insure that flip-flop 150 is reset to "0" upon the occurrence of the next leading or trailing edge transition. Since, as will be explained hereinafter, the output of flip-flop 150 is used to synchronize double density NRZ generator 18, sync pulse 82 insures that the data clock from flip-flop 150 is always in the correct phase.

The leading and trailing edge pulses from gate 34 are compared with the data clock output of flip-flop 150 in gate 57, and if coincidence occurs when flip-flop 150 is false, a data reset pulse is generated at the output of gate 57. The output of gate 57 appears as waveform *m* in FIG. 4. The D/D data pulses from gate 50 are compared with the data clock output of flip-flop 150 in gate 56, and if coincidence occurs when flip-flop 150 is false, a data set pulse is generated at the output of gate 56. The output of gate 56 appears as waveform *k* in FIG. 4. Flip-flop 180 is reset upon the occurrence of every data reset pulse from gate 57 and is set upon the occurrence of every data set pulse from gate 56. The Q output of flip-flop 180 is, therefore, the NRZ format equivalent of the double density word input.

More specifically, and with reference to FIG. 4, it is seen that two pulses appear at the output of gate 52 for every bit cell. Due to the sync pulse generated by gate 53 in combination with flip-flops 51 and 54 and ring counter 13, flip-flop 150 is always false at the end of each bit cell, flip-flop 150 being driven true either by a leading or trailing edge pulse at the beginning of the next bit cell or by a D/D data pulse after the beginning of the next bit cell. Accordingly, since flip-flop 150 enables gates 56 and 57 only when false gates 56 and 57 operate to examine the input data only at the end of each bit cell. If a leading or trailing edge pulse occurs when flip-flop 150 is false, at the end of each bit cell, it is indicative that a transition occurred at the end of such bit cell and that the preceding bit cell contained a "0". On the other hand, if no leading or trailing edge pulse occurs when flip-flop 150 is false, but rather a D/D data pulse occurs, it is indicative that there was no transition at the end of such bit cell and that the preceding bit cell contained a "1". Therefore, the pulses from gate 56 indicate that the previous bit cell contained a "1", these pulses being utilized to set flip-flop 180 and the pulses from gate 57 indicate that the previous bit cell contained a "0", these pulses being utilized to reset flip-flop 180. Therefore, the Q output of flip-flop 180 is the NRZ equivalent of the double density word input.

The Q and $\bar{Q}$ outputs of flip-flop 180 are applied to the J and K inputs, respectively, of flip-flop 181 which is clocked by the Q output of flip-flop 150. Flip-flop 181, therefore, synchronizes the NRZ data from flip-flop 180 with the clock output of flip-flop 150 so that the transitions of the NRZ format equivalent from flip-flop 181 exactly coincide with the transitions of the data clock generated by flip-flop 150.

Figure 5:
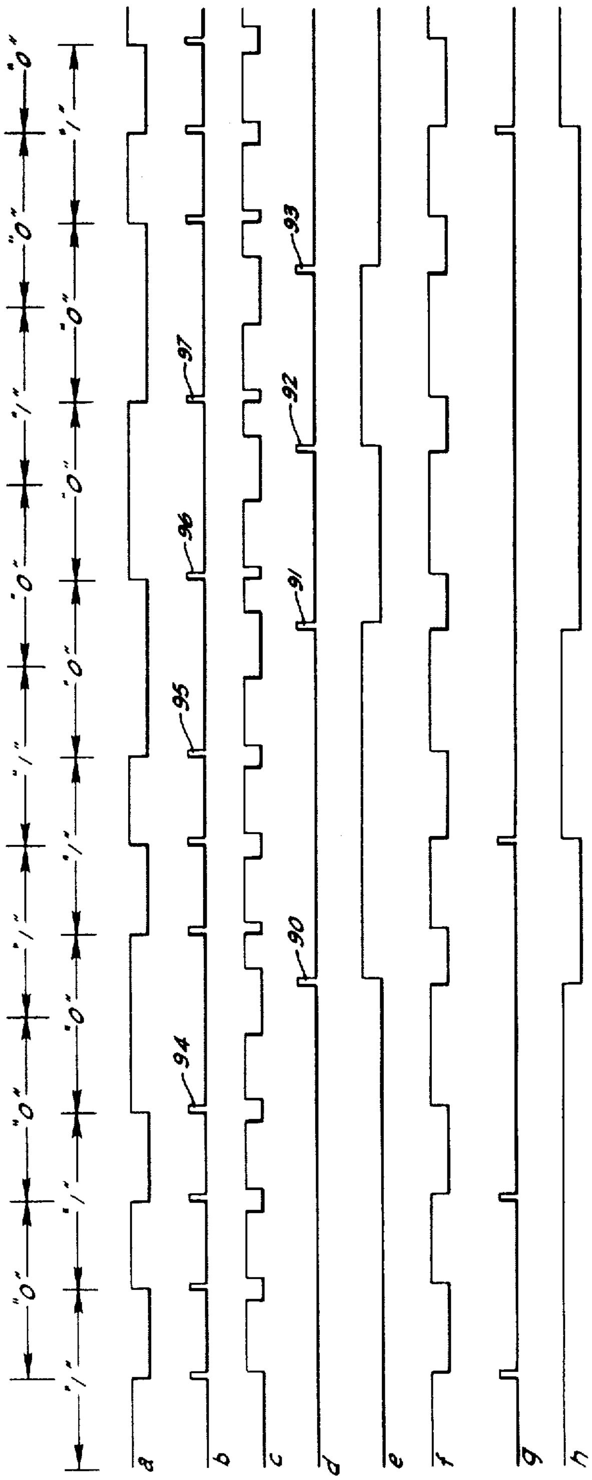
FIGS. 4 and 5 are a series of waveforms useful in explaining the operation of the embodiment of FIG. 3.

The operation of data format converter 10 in the conversion of a data input signal that has been phase encoded in accordance with a bi-phase format will now be described in connection with the waveforms of FIG. 5. A typical input signal, phase encoded in accordance with a bi-phase format is shown as waveform *a* in FIG. 5 with the NRZ significance indicated immediately thereabove. More specifically, the data in waveform *a* may be phase encoded in accordance with any of the three bi-phase formats discussed previously with respect to waveforms *b*, *c* and *d* of FIG. 1. Data format converter 10 is operative to generate the NRZ format equivalent regardless of the input format. If the data is phase encoded in accordance with the bi-phase mark format, the NRZ significance is indicated immediately above waveform *a*. If the data is phase encoded in accordance with the bi-phase space format, the NRZ format equivalent would be the exact opposite of the NRZ format equivalent for the bi-phase mark format. Finally, if the input data is phase encoded in accordance with the bi-phase level format, the NRZ format equivalent is indicated directly above the NRZ format equivalent for bi-phase mark.

The operation of data synchronizer 11 and ring counter 13 in the generation of the NRZ format equivalent of a bi-phase encoded input signal is identical to the operation previously described with respect to the conversion from a double density format to the NRZ format. The difference lies in the decoding logic connected to the output of ring counter 13. More specifically, data format converter 10 includes a NAND gate 47 which receives the Q output of flip-flop 46 and the $\bar{Q}$ output of flip-flop 45. As a result, gate 47 generates an output pulse after 12 clock pulses have been counted by ring counter 13 after each leading or trailing edge transition. These pulses are utilized, together with the leading and trailing edge pulses, to convert the bi-phase data. More generally, a leading or trailing edge pulse will be generated by gate 34 for every transition of the input data signal. Such leading and trailing edges are shown as waveform *b* in FIG. 5. Since there will always be at least one transition for each bit cell, the maximum spacing between leading and trailing edges will be the equivalent of 16 clock pulses. Furthermore, if there are two transitions during each bit cell, the spacing between consecutive leading and trailing edges will be the equivalent of eight clock pulses. Accordingly, gate 47 operates to indicate that a half of a bit cell has passed without a transition, this being the only information theoretically required, other than the occurrence of a leading or trailing edge transition, to generate a bi-phase clock and to convert the bi-phase data to its NRZ format equivalent. In order to provide for instantaneous changes in the data rate, gate 47 decodes ring counter 13 after twelve pulses following a leading or trailing edge. However, it will be appreciated by those skilled in the art that gate 47 could also decode ring counter 13 after nine, 10 or 11 pulses following each leading and trailing edge.

The Q output of flip-flop 41 is shown as waveform *c* in FIG. 5 and the pulses generated by gate 47, hereinafter referred to as bi-phase (B/P) data pulses, are shown as waveform *d*. As shown in FIG. 5, B/P data pulses occur at 90, 91, 92 and 93 following leading or trailing edge pulses at 94, 95, 96 and 97, respectively, since each of these leading and trailing edge pulses are followed by additional leading or trailing edge pulses one bit cell, or 16 clock pulses, thereafter. The bi-phase data pulses are applied to the reset input R of bi-phase clock generator flip-flop 200 whereas the clock input C of flip-flop 200 receives the leading and trailing edge pulses from gate 34. The output of flip-flop 200, shown as waveform *f* in FIG. 5, which changes state on each leading and trailing edge pulse and is reset on each bi-phase data pulse, comprises the bi-phase data clock.

In order to convert a bi-phase data input to its NRZ format equivalent when the input data is phase encoded in accordance with the bi-phase level format, the data and the inverse of the data are applied to the J and K inputs, respectively, of flip-flop 220 and the B/P data pulses from gate 47 are applied to the C input of flip-flop 220. If the data is high when a B/P data pulse occurs, flip-flop 220 goes true. If the data is low when a B/P data pulse occurs, flip-flop 220 goes false. In this manner, the output of flip-flop 220 is the NRZ equivalent of the bi-phase level word input.

More specifically, a B/P data pulse occurs only when more than half a bit cell goes by without a leading or trailing edge transition. When data is phase encoded in accordance with the bi-phase level format, this condition indicates that the data has changed from a "1" to a "0" or visa versa. If the data is high when a B/P data pulse occurs, such as at 90 or 92, it is indicative that the next bit cell will have a transition from high to low at the middle thereof, indicative of a "1". As a result, flip-flop 220 goes true when the B/P data pulse occurs. Conversely, if the data is low when a B/P data pulse occurs, such as at 91 or 93, it is indicative that there will be a data transition from low to high at the middle of the next bit cell, indicative of a "0" and flip-flop 220 goes false. The output of flip-flop 220 is applied to flip-flop 220 is applied to flip-flop 221 which synchronizes the NRZ data with the bi-phase data clock. The resultant output of flip-flop 221 is shown as waveform *e* in FIG. 5 and is the NRZ format equivalent when the input data is phase-encoded in accordance with the bi-phase level format.

In order to generate the NRZ format equivalent when the input data is phase encoded in accordance with the bi-phase mark or bi-phase space format, the Q output of flip-flop 200 is applied to one input of gate 48 which receives, at its other input, the leading and trailing edge pulses from gate 34. If coincidence occurs between the leading and trailing edge pulses and the true state of flip-flop 200, indicating a transition at the middle of a bit cell, a pulse is generated by gate 48 which sets flip-flop 210. More specifically, when the input data is phase encoded in accordance with a bi-phase mark or bi-phase space format, whether or not a transition occurs at the middle of a bit cell indicates whether the data is a "1" or a "0". Since the B/P data pulses from gate 47 can only occur shortly after the middle of a bit cell and are utilized to reset flip-flop 200, flip-flop 200 is always true at the exact middle of a bit cell. Accordingly, a leading or trailing edge pulse occurring when flip-flop 200 is true indicates a transition at the middle of the bit cell and a "1" when the input data is phase encoded in accordance with the bi-phase mark format. The B/P data pulses from gate 47 are applied to the reset input R of flip-flop 210. Since these pulses indicate that a transition did not occur at the middle of a bit cell, and that a "0" was therefore present during that bit cell, such pulses are utilized to reset flip-flop 210. As a result, the Q output of flip-flop 210 is the NRZ equivalent of the data input when phase encoded in accordance with the bi-phase mark format. Since the bi-phase mark and bi-phase space formats are converses of each other, the $\bar{Q}$ output of flip-flop 210 is the NRZ equivalent of the data input when phase encoded in accordance with the bi-phase space format. Finally, the output of flip-flop 210 is applied to the input of flip-flop 211 which synchronizes the NRZ data with the bi-phase data clock. The resultant Q output of flip-flop 211 is shown as waveform h in FIG. 5.

It can therefore be seen that there is provided, in accordance with the present invention, apparatus for converting serial digital data which is phase encoded in accordance with a self-clocking bi-phase or double density format to its NRZ format equivalent accompanied by a coherent clock signal which eliminates all of the problems inherent in prior art systems. In the first instance, the present system is capable of converting serial digital data which is phase encoded in accordance with any bi-phase or double density format to its NRZ format equivalent. Furthermore, data format converter 10 operates without any input as to what format the input data is in. In other words, converter 10 provides a plurality of NRZ encoded output signals, one for each possible bi-phase or double density input formats, and it is only necessary to select the desired output signal based upon a knowledge of the format of the input data. Secondly, the present system is readily adaptable to changes in the data rate. More specifically, since data format converter 10 is entirely synchronized by clock generator 12, the only requirement is that clock generator 12 operate, in accordance with the preferred embodiment, at sixteen times the normal data rate. Therefore, when the data rate changes, it is only necessary to adjust the frequency of clock generator 12 to insure the 16 times correspondence between the data rate and the clock rate. Since this adjustment may be readily made externally of converter 10 itself, there is no requirement to change circuit components in converter 10 when the data rate changes.

Digital format converter 10 also entirely eliminates the use of delay networks and phase-locked oscillator circuits. By eliminating such networks and circuits and by a judicious selection of the times of decoding ring counter 13, converter 10 is capable of tracking instantaneous data rate changes of up to approximately 27 percent in the case of a bi-phase input signal and up to approximately 12 percent for a double density input signal. Finally, the present system generates, on a bit cell by bit cell basis, a coherent clock signal which is synchronized with the NRZ output signal.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

We claim:

1. Apparatus for converting serial digital data, phase encoded in accordance with a self-clocking format, to its NRZ format equivalent and a coherent clock signal, comprising:

input means responsive to said data for generating a first pulse for each transition of said data;

generator means for generating a series of second pulses in accordance with a predetermined time sequence, said time sequence being determinable independently of the period of said data, said first pulses being applied to said generator means for restarting said time sequence;

means responsive to said first and second pulses for generating said coherent clock signal, said clock signal comprising a wave which changes state upon the occurence of a first or a second pulse; and logic means responsive to said first and second pulses and said clock signal for generating said NRZ format equivalent of said digital data in synchronism with said clock signal.

2. Apparatus according to claim 1 wherein said generator means comprises:

clock generator means for generating a train of clock pulses at a frequency which is substantially higher than the frequency of said digital data; and a ring counter, said ring counter receiving and counting said clock pulses, said first pulses being applied to said ring counter for resetting said ring counter to a predetermined starting count.

3. Apparatus according to claim 2 wherein said generator means further comprises:

logic means for sensing a predetermined count in said ring counter and for generating said second pulses upon the occurrence of said predetermined count.

4. Apparatus according to claim 3 wherein each of said second pulses from said ring counter is indicative of the absence of a transition of said digital data for at least one half of a bit cell of said digital data.

5. Apparatus according to claim 4 wherein said serial digital data is phase encoded in accordance with a double density format, and wherein said generator means further comprises:

logic means for generating a third pulse when at least one and a half bit cells of said data have occurred without a transition thereof, said third pulse being applied to said coherent clock signal generating means for establishing the phase of said square wave.

6. Apparatus according to claim 4 wherein the frequency of said train of clock pulses is a predetermined multiple of the frequency of said digital data whereby changes in the frequency of said data may be compensated for by changing the frequency of said train of clock pulses.

7. Apparatus according to claim 1 wherein said serial digital data is phase encoded in accordance with any bi-phase or double density format and wherein said logic means is operative to generate a plurality of NRZ encoded output signals, one for each of said bi-phase and double density input formats.

8. Apparatus according to claim 1 wherein said means for generating said coherent clock signal comprises:

bi-stable circuit means which changes state upon the occurrence of a first or a second pulse.

9. Apparatus according to claim 1 wherein said serial digital data is phase encoded in accordance with a double density format and wherein the time interval between the first-occurring second pulse of said series of second pulses and the preceding first pulse is approximately equal to one half of a bit cell of said digital data.

10. Apparatus according to claim 9 wherein the time interval between consecutive second pulses of said series of second pulses is at least equal to one half of a bit cell of said digital data.

11. Apparatus according to claim 10 wherein said logic means comprises:

bi-stable circuit means having a set input terminal and a reset input terminal;

first means for comparing said first pulses and said clock signal and for applying a signal to said reset input terminal when a predetermined coincidence condition exists; and second means for comparing said second pulses and said clock signal and for applying a signal to said set input terminal when a predetermined coincidence condition exists, the output of said bi-stable circuit means comprising the NRZ format equivalent of said double density data.

12. Apparatus according to claim 11 wherein said first and second comparing means operate to examine the state of said digital data at the end of each bit cell and to reset said circuit means when a first pulse occurs at the end of a bit cell and to set said circuit means when a second pulse occurs at the end of a bit cell.

13. Apparatus according to claim 10 wherein said generator means further comprises:

logic means responsive to the occurrence of a second pulse in said series of second pulses for inhibiting the generation of additional second pulses and for generating a sync pulse when at least an additional half bit cell of said data has occurred without a transition thereof, said sync pulse being applied to said clock signal generating means for establishing the phase of said square wave.

14. Apparatus according to claim 1 wherein said serial digital data is phase encoded in accordance with a bi-phase format and wherein the time interval between the first-occurring second pulse of said series of second pulses and the preceding first pulse is more than one half of a bit cell of said digital data and less than one bit cell of said digital data.

15. Apparatus according to claim 14 wherein said serial digital data is phase encoded in accordance with a bi-phase level format and wherein said logic means comprises:

means for comparing said second pulses and said digital data, said comparing means providing said NRZ format equivalent.

16. Apparatus according to claim 15 wherein said comparing means comprises:

bi-stable circuit means having true and false states, said circuit means going true if said digital data is high when a second pulse occurs, and said circuit means going false if said digital data is low when a second pulse occurs.

17. Apparatus according to claim 14 said serial digital data is phase encoded in accordance with a bi-phase level format and wherein said logic means comprises:

a bi-stable flip-flop having a set input terminal, a reset input terminal and a clock input terminal, said set and reset input terminals receiving said digital data and the inverse of said digital data, respectively, said second pulses being applied to said clock input terminal.

18. Apparatus according to claim 1 wherein said serial digital data is phase encoded in accordance with a bi-phase format and wherein said means for generating said coherent clock signal comprises:

first bi-stable circuit means having a set input terminal and a reset input terminal, said first pulses being applied to said set input terminal and said second pulses being applied to said reset input terminal.

19. Apparatus according to claim 18 wherein said logic means comprises:

second bi-stable circuit means having a set input terminal and a reset input terminal, said second pulses being applied to said reset input terminal; and means for comparing said first pulses and said clock signal and for applying a signal to said set input terminal of said second bi-stable circuit means when a predetermined coincidence condition exists.

20. Apparatus according to claim 19 wherein said comparing means is operative to sense the existence of a first pulse at the middle of each bit cell of said data whereby said second bi-stable circuit means is set when a first pulse occurs at the middle of a bit cell and is reset upon the occurrence of every second pulse.

21. Apparatus according to claim 20 wherein said second bi-stable circuit means has normal and complementary output terminals, wherein said normal output terminal of said second bi-stable circuit means provides the NRZ format equivalent where said data is phase encoded in accordance with a bi-phase mark format and wherein said complementary output terminal of said second bi-stable circuit means provides the NRZ format equivalent where said data is phase encoded in accordance with a bi-phase space format.

22. Apparatus for converting serial digital data, phase encoded in accordance with a self-clocking format, to its NRZ format equivalent and a coherent clock signal, comprising:

means operative independently of said data for generating a series of pulses in accordance with a predetermined time sequence, the period of said pulses being determinable independently of the period of said data, said data being applied to said generating means only for re-starting said time sequence upon the occurrence of a transition of said data;

means responsive to said data and said pulses for generating said coherent clock signal, said clock signal providing a clock indication upon the occurrence of a transition of said data or upon the occurrence of one of said pulses; and means responsive to said data and said pulses for generating said NRZ format equivalent of said data.

23 Apparatus according to claim 22 further comprising:

input means responsive to said data for generating a pulse upon the occurrence of a transition of said data, said pulse being applied to said means for generating a series of pulses for re-starting said time sequence.

24. Apparatus according to claim 22 wherein said means for generating a series of pulses comprises:

clock generator means for generating a train of clock pulses at a frequency which is substantially higher than the frequency of said digital data; and a ring counter, said ring counter receiving and countering said clock pulses, said ring counter being reset to a predetermined starting count upon the occurrence of a transition of said data.

25 Apparatus according to claim 24 wherein said means for generating a series of pulses further comprises:

logic means for sensing a predetermined count in said ring counter and for generating a pulse upon the occurrence of said predetermined count.

26. Apparatus according to claim 25 wherein each of said pulses of said series of pulses is indicative of the absence of a transition of said digital data for at least one-half of a bit cell of said digital data.

27. Apparatus according to claim 22 wherein said serial digital data is phase encoded in accordance with any bi-phase or double density format and wherein said means for generating said NRZ format equivalent is operative to generate a plurality of NRZ encoded output signals, one for each of said bi-phase and double density input formats.

28 Apparatus for converting serial digital data, phase encoded in accordance with a self-clocking format, to its NRZ format equivalent and a coherent clock signal comprising:

input means responsive to said data for generating a first pulse for each transition of said data;

generator means responsive to said first pulses for generating at least one second pulse a predetermined time interval after the occurence of each of said first pulses, said time interval being determinable independently of the period of said data, each of said first pulses re-starting said predetermined time interval, whereby each of said second pulses is indicative of the absence of a transition of said data for at least said predetermined time interval;

means responsive to said first and second pulses for generating said coherent clock signal, said clock signal providing a clock indication upon the occurrence of a first or a second pulse, and logic means responsive to said first and second pulses for generating said NRZ format equivalent of said data.

29. Apparatus according to claim 28 wherein said clock signal comprises a wave which changes state upon the occurrence of a first or a second pulse.

30. Apparatus according to claim 28 wherein said logic means is further responsive to said clock signal for generating said NRZ format equivalent of said digital data in synchronism with said clock signal and independently of the transitions of said digital data.

31. Apparatus according to claim 1 wherein said generator means operates to generate said second pulses independently of the occurrence of said first pulses from said input means, said first pulses operating only to re-start said time sequence.

* * * * *